(12) United States Patent
Nagano

(10) Patent No.: US 7,095,441 B2
(45) Date of Patent: Aug. 22, 2006

(54) IMAGE PICK-UP APPARATUS HAVING PLURAL PIXELS WITH DIFFERENT TRANSMITTANCES AND BEING OPERABLE IN DIFFERENT MODES

(75) Inventor: Akihiko Nagano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 10/278,808

(22) Filed: Oct. 24, 2002

(65) Prior Publication Data

US 2003/0086008 A1    May 8, 2003

(30) Foreign Application Priority Data

Nov. 8, 2001 (JP) .............................. 2001-343546

(51) Int. Cl.
*H04N 5/335* (2006.01)
(52) U.S. Cl. ...................... 348/308; 348/280; 348/276
(58) Field of Classification Search ................ 348/275, 348/276, 277, 300, 301, 315, 316, 308, 272, 348/280

See application file for complete search history.

(56) References Cited

U.S. PATENT DOCUMENTS

| | | | |
|---|---|---|---|
| 4,059,839 A * | 11/1977 | Yamanaka et al. | 348/274 |
| 4,721,999 A * | 1/1988 | Takemura et al. | 348/276 |
| 6,642,964 B1 * | 11/2003 | Perregaux et al. | 348/315 |
| 6,819,360 B1 * | 11/2004 | Ide et al. | 348/340 |
| 6,831,692 B1 * | 12/2004 | Oda | 348/315 |
| 6,900,838 B1 * | 5/2005 | Fujimura et al. | 348/273 |

FOREIGN PATENT DOCUMENTS

JP    2001-124984    5/2001

* cited by examiner

*Primary Examiner*—Ngoc-Yen Vu
*Assistant Examiner*—Nicholas G Giles
(74) *Attorney, Agent, or Firm*—Fitzpatrick, Cella, Harper & Scinto

(57) ABSTRACT

An image pick-up apparatus includes a plurality of pixels, each of which includes a photoelectrically converting area for converting an optical signal from a subject into an electronic signal. A plurality of first pixels included in the plurality of pixels have a first transmittance as a light transmittance to the photoelectrically converting area, and a plurality of second pixels included in the plurality of pixels have a second transmittance as a light transmittance to the photoelectrically converting area. The second transmittance is higher than the first transmittance, and a light receiving area for receiving light of each of the plurality of first pixels is larger than a light receiving area for receiving light of each pixel of the plurality of second pixels.

5 Claims, 10 Drawing Sheets

FIG. 9A  FIG. 9B  FIG. 9C
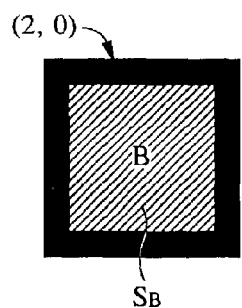
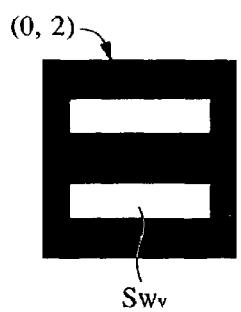
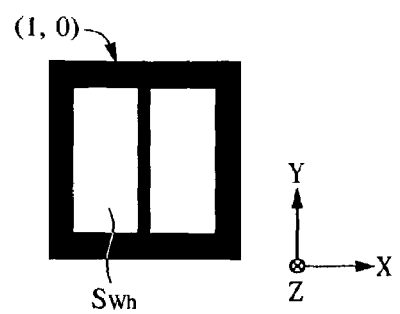
FIG. 10
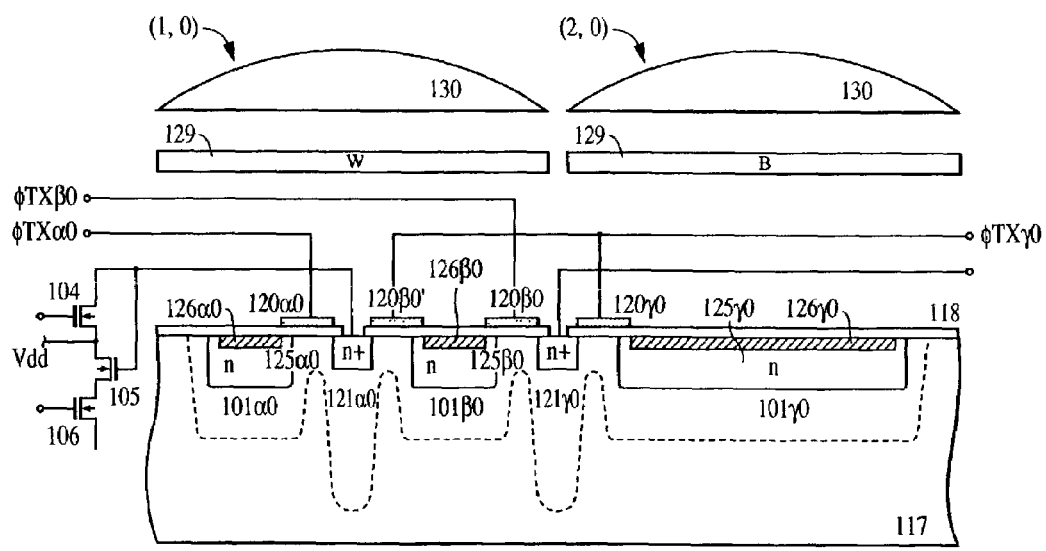

IMAGE PICK-UP APPARATUS HAVING PLURAL PIXELS WITH DIFFERENT TRANSMITTANCES AND BEING OPERABLE IN DIFFERENT MODES

BACKGROUND OF THE INVENTION

1. Field of the Invention

The present invention relates to an image pick-up apparatus for picking up an image of a subject.

2. Description of the Related Art

Hitherto, image pick-up apparatuses for a digital camera and the like comprise color filters which are arranged between two-dimensionally arranged pixels and an image pick-up lens for condensing light from a subject so as to obtain a color image.

FIG. 17 is a schematic diagram of the conventional arrangement of color filters. Herein, a Bayer arrangement is shown. Reference symbols R, G, and B denote a red transmitting filter, a green transmitting filter, and a blue transmitting filter, respectively.

Referring to FIG. 17, an image pick-up operation and an the operation for detecting a focal point is performed by using a signal from the image pick-up apparatus having the arrangement of color filters shown in FIG. 17.

However, in the conventional art, the color filters are arranged to obtain a color image, and therefore the signal level output from each pixel is lower than that in the case of no arrangement of the color filters. More specifically, the signal level with the color filters is approximately ⅓ of that in the case of no arrangement of the color filters.

SUMMARY OF THE INVENTION

Accordingly, it is an object of the present invention to provide an image pick-up apparatus which can perform both an image pick-up operation and an operation for detecting a focal point.

In order to accomplish the above-mentioned object, according to one aspect of the present invention, there is provided an image pick-up apparatus, comprising a plurality of pixels, each of the pixels including a photoelectrically converting area for converting an optical signal from a subject into an electronic signal, wherein a plurality of first pixels included in the plurality of pixels have a first transmittance as a light transmittance to the photoelectrically converting area, a plurality of second pixels included in the plurality of pixels have a second transmittance as a light transmittance to the photoelectrically converting area, the second transmittance being higher than the first transmittance, and a light receiving area for receiving light of the first pixel of the plurality of first pixels is larger than a light receiving area for receiving light of a second pixel of the plurality of second pixels.

According to another aspect of the present invention, there is provided an image pick-up apparatus comprising: a plurality of pixels including a first pixel and a second pixel, the first pixel having a plurality of photoelectrically converting areas, a common amplifying device for amplifying and outputting signals from the plurality of photoelectrically converting areas, and a plurality of first transfer switches for connecting the common amplifying device to the plurality of photoelectrically converting areas, the second pixel having at least a photoelectrically converting area, an amplifying device for amplifying and outputting a signal from the photoelectrically converting area, and a second transfer switch for connecting the photoelectrically converting area to the amplifying device; and a third switch for transferring the signal from the photoelectrically converting area included in the first pixel to the amplifying device included in the second pixel.

Further objects, features and advantages of the present invention will become apparent from the following description of the preferred embodiments (with reference to the attached drawings).

BRIEF DESCRIPTION OF THE DRAWINGS

FIGS. 9A to 9C are enlargement views of pixels (2,0), (0,2), and (1,0) in FIG. 8;

FIG. 10 is a cross-sectional view of the image sensor in FIG. 7;

DESCRIPTION OF THE PREFERRED EMBODIMENTS

Hereinbelow, embodiments of the present invention will be described with reference to the drawings.

First Embodiment

Figure 1:
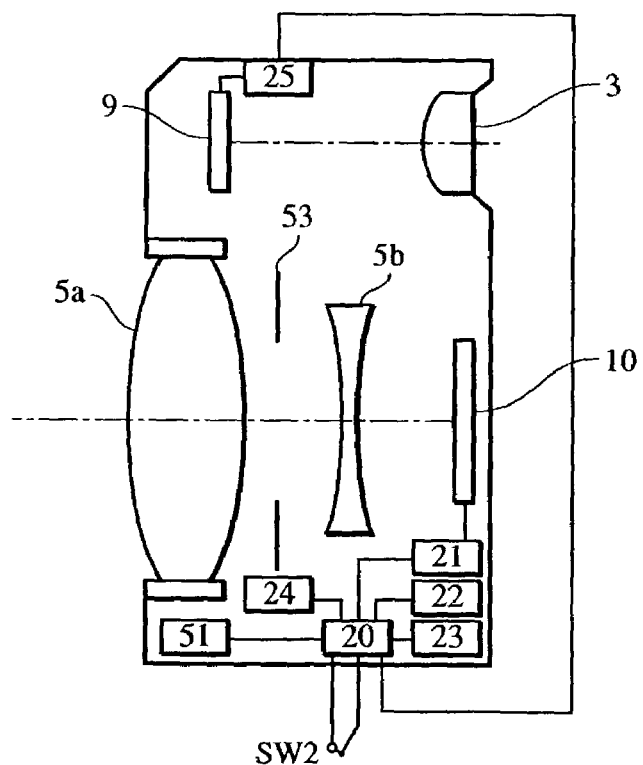
FIG. 1 is a block diagram of the schematic structure of a digital still camera according to a first embodiment of the present invention.

FIG. 1 is a block diagram showing the schematic structure of a digital still camera 1 according to the first embodiment of the present invention. Referring to FIG. 1, the digital still camera 1 comprises a photographing lens 5 including a convex lens 5a, a concave lens 5b, and a stop 53, which condenses light from a subject, a photographing lens driver 51 for moving the photographing lens 5, an image sensor 10 arranged to a prearranged image forming surface of the photographing lens 5, an image sensor control circuit 21 for controlling the driving of the image sensor 10, an image processing circuit 24 for processing an image signal from the image sensor 10, a liquid crystal display device 9 for displaying the image processed by the image processing circuit 24, a liquid crystal display driving circuit 25 for driving the liquid crystal display device 9, an eye piece 3 for viewing an image of the subject displayed on the liquid crystal display device 9, a memory circuit 22 for recording the image signal from the image sensor 10, an interface circuit 23 for outputting the image processed by the image processing circuit 24 to the outside of the digital still camera 1, and a CPU 20 for controlling the operations of the image sensor control circuit 21, the memory circuit 22, the interface circuit 23, and the image processing circuits 24 and 51 and performing the calculation for the detection of the focal point.

As shown in FIG. 1, the photographing lens 5 is shown comprising two lenses, convex lens 5a and concave lens 5b; however, photographing lens 5 may actually comprise a number of lenses as is known in the art.

Figure 2:
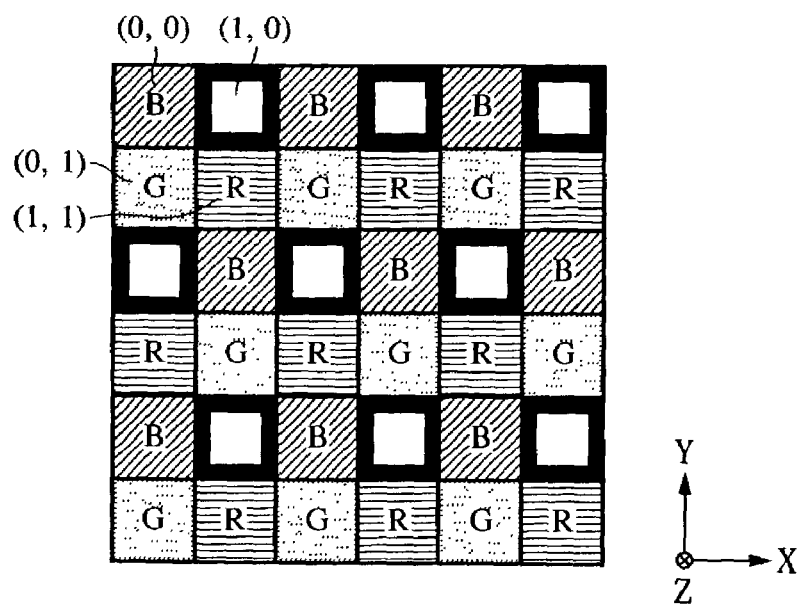
FIG. 2 is a plan view of the schematic structure of an image sensor in FIG. 1.

FIG. 2 is a plan view of the schematic structure of the image sensor 10 in FIG. 1. Referring to FIG. 2, pixels with six rows and six columns are aligned. However, the pixels corresponding to the use are actually aligned. Reference symbols "R", "G", and "B" denote the color of red, green, and blue color filters of the pixels. The same color pixels are aligned with grid patterns to improve the resolution of the picked-up image.

Herein, the arrangement of the pixels is similar to the Bayer arrangement. Differently from the Bayer arrangement, the number of "G" is small. Therefore, upon normal-image pick-up operation, a color difference signal is output by "R", "G", and "B" pixel outputs, and a luminance signal is generated by the output of the pixel to which the color filter is not formed (that is, the pixel without the color filter).

Figure 15:
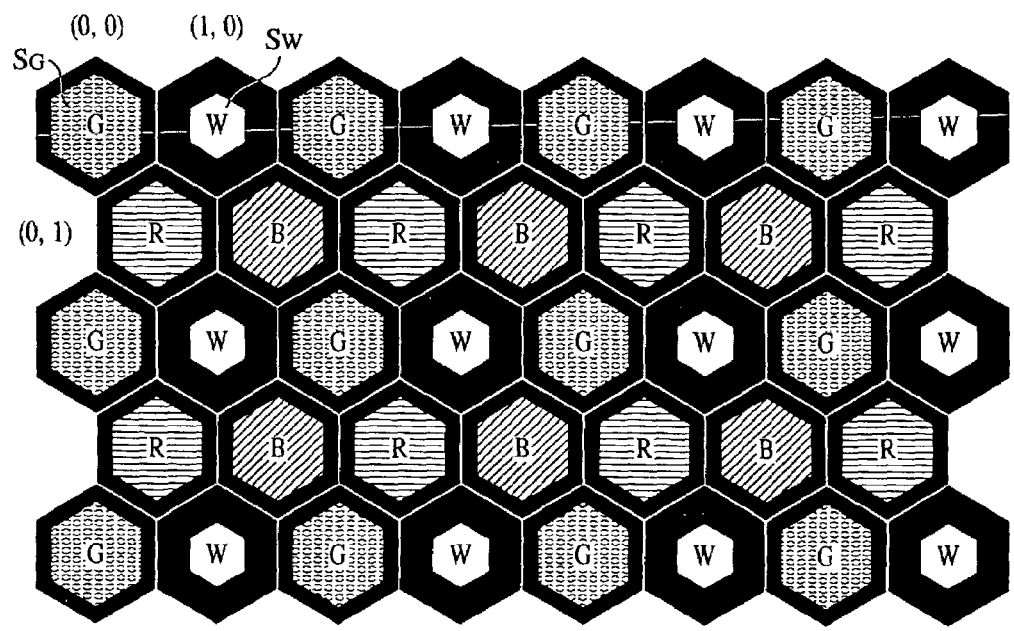
FIG. 15 is a plan view showing an example of a hexangular pixel in FIG. 2.

Referring to FIG. 15, the shape of the pixel may be hexangular and may have an arrangement similar to that different from the Bayer arrangement.

Figure 3A:
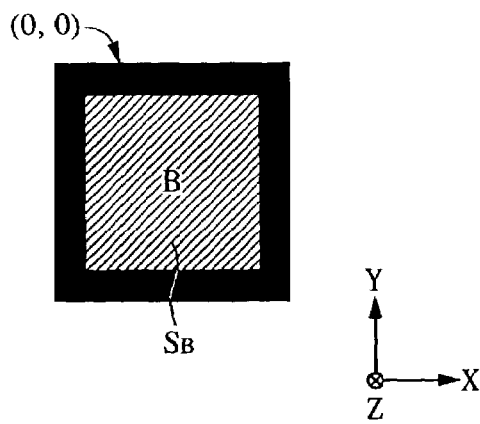
FIGS. 3A and 3B are enlargement views of pixels (0, 0) and (1, 0) in FIG. 2.
Figure 3B:
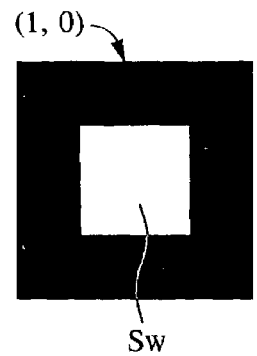

FIGS. 3A and 3B are enlargement views of pixels (0, 0) and (1, 0) in FIG. 2. The pixels (0, 0) and (1, 0) comprise photoelectrically converting units $S_B$ and $S_W$, respectively. Referring to FIGS. 3A and 3B, an area of the photoelectrically converting unit $S_B$ in the pixel (0, 0) is larger than that of the photoelectrically converting unit SW in the pixel (1, 0).

According to the first embodiment, areas of photoelectrically converting units $S_G$ and $S_R$ of the pixels (0, 1) and (1, 1) are equal to the area of the photoelectrically converting unit $S_B$. However, they may be changed depending on the difference of the output levels of R, G, and B. Incidentally, the area of the photoelectrically converting unit means an area of a photoelectrically converting region for substantially photoelectrical conversion determined depending on a numerical aperture of the pixel.

Herein, the area of the photoelectrically converting unit $S_W$ is smaller than those of the remaining photoelectrically converting units $S_G$, $S_R$, and $S_B$ for the purpose of preventing the saturation of stored charges which is caused by the pixel (0, 0) having a higher light receiving efficiency as compared with other pixels.

Ratios of the photoelectrically converting units $S_G$, $S_R$, and $S_B$ to the photoelectrically converting units $S_W$ are determined depending on light transmittances. Since the light transmittance of the color filter is about ⅓, the area of the photoelectrically converting units $S_W$ is about ⅓ of the individual areas of the photoelectrically converting units $S_G$, $S_R$, and $S_B$.

If the area of the photoelectrically converting units $S_W$ is smaller than ⅓ of the individual areas of the photoelectrically converting units $S_G$, $S_R$, and $S_B$, an image with a high S/N ratio cannot be obtained in the case of the subject with a low luminance. Therefore, the area of the photoelectrically converting units $S_W$ is actually ⅓ or more of the individual areas of the photoelectrically converting units $S_G$, $S_R$, and $S_B$.

In summary, according to the first embodiment, the areas of the photoelectrically converting units $S_W$, $S_G$, $S_R$, and $S_B$ are as follows.

$$S_B = S_G = S_R$$

$$S_B > S_W \geq S_B/3$$

Figure 16:
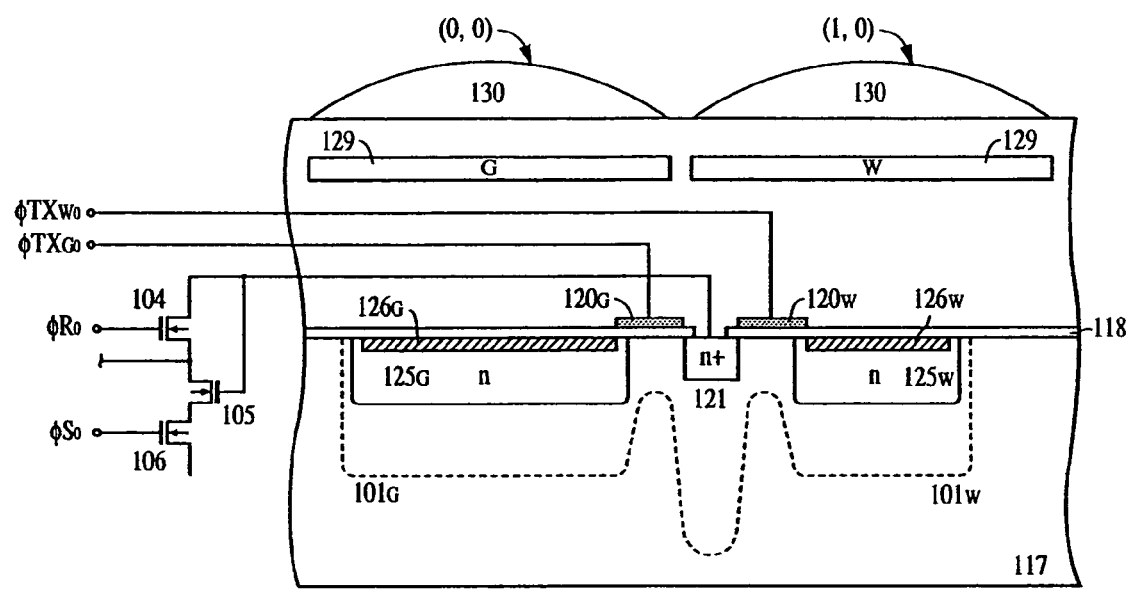
FIG. 16 is a cross-sectional view of an image sensor in FIG. 1.
Figure 17:
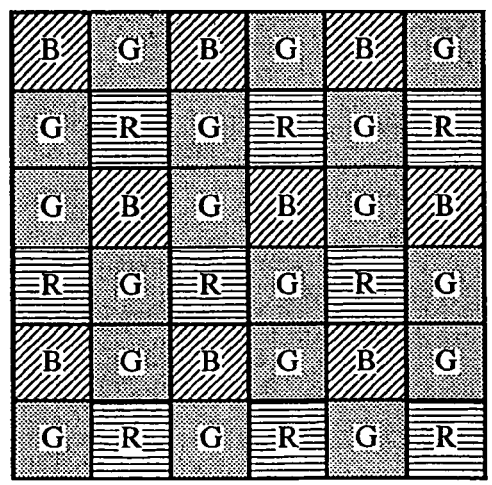
FIG. 17 is a schematic diagram of the conventional arrangement of color filters.

FIG. 16 is a cross-sectional view of the image sensor 10 in FIG. 1. Referring to FIG. 16, the image sensor 10 comprises a CMOS image sensor. Herein, the cross-sectional views of the pixels in FIGS. 3A and 3B are shown.

Reference numeral 117 denotes a P-type well, and reference numeral 118 denotes a $SiO_2$ film as an MOS gate insulating film. Reference numerals $126_G$ and $126_W$ denote surface $P^+$ layers, and form n layers $125_G$ and $125_W$ and photoelectrically converting units $101_G$ and $101_W$, respectively.

Reference numerals $120_G$ and $120_W$ denote transfer gates for transferring optical charges stored in the photoelectrically converting units $101_G$ and $101_W$ to floating diffusion unit (hereinafter, referred to as FD unit) 121.

Further, reference numeral 129 denotes the color filter, and reference numeral 130 denotes a micro lens. Each micro lens 130 is formed at a position and of a shape in which the pupil of the photographing lens 5 and the photoelectrically converting unit 101 of the image sensor 10 are conjugate.

The FD unit 121 is arranged on the pixel (1, 0) side. Since the n-layer $125_W$ is smaller than the n-layer $125_G$, the FD units 121 are formed near the n-layer $125_W$ and the size of the image sensor 10 can be decreased. Incidentally, the FD unit 121 is formed between the pixels (0, 1) and (1, 1) and the pixel (1, 0). These FD units 121 are arranged on the pixel (1, 0) side.

Figure 4:
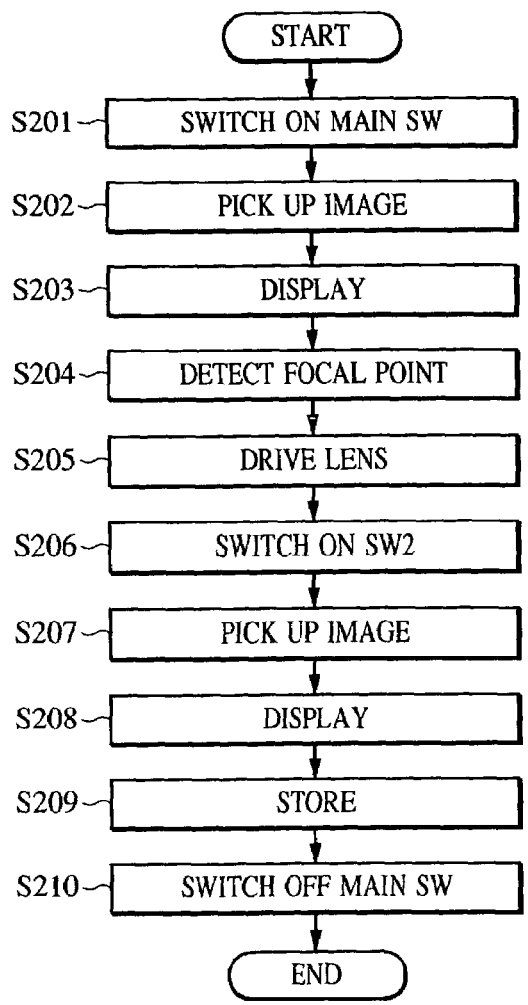
FIG. 4 is a flowchart showing the operation of the digital still camera 1 in FIG. 1.

FIG. 4 is a flowchart showing the operation of the digital still camera 1 in FIG. 1.

A photographing person switches on a main switch (not shown) of the digital still camera 1 in FIG. 1 (step S201). Then, the CPU 20 sends a control signal to the image sensor control circuit 21 and picks up an image for display operation on the image sensor 10 and for focus detection (step S202).

The image signal which is picked up by the image sensor 10 is A/D converted by the image processing circuit 24 and thereafter is subjected to image processing. In this case, predetermined image processing is performed based on an output signal from the image sensor 10 for color reproduction.

The image signal which is subjected to image processing is displayed on the liquid crystal display device 9 by the liquid crystal display device driving circuit 25 so that the photographing person observes the subject image via the eye piece 3 (step S203).

Further, the CPU 20 performs a calculation for focus detection of the photographing lens 5. The calculation is performed based on the output of the image sensor 10 and uses a so-called climbing type focus detecting method for searching peaks of contrasts of the subject image (step S204).

If the photographing lens 5 is not in a focusing state, the photographing lens 5 is driven by a predetermined amount so as to be close to the focusing state. Specifically, the CPU 20 sends a lens driving signal to the photographic lens driver 51 and drives the photographing lens 5 by the predetermined amount (step S205).

Further, the CPU 20 switches on a switch SW2 for recording the picked-up image (step S206). Then, the CPU 20 sends a control signal to the image sensor control circuit 21 and the image sensor 10 performs the actual image pick-up operation (step S207).

In this case, since the photoelectrically converting units of the pixel to which the color filter is formed (that is, the pixel with the color filter) have the same size, deterioration in sensitivity is prevented and a color difference signal with a high S/N ratio can be obtained.

Since the area of the photoelectrically converting unit of the pixel to which the color filter is not formed (that is, the pixel without the color filter) is smaller than the area of the photoelectrically converting unit of the pixel with the color filter, the luminance signal can also be output without saturating the output of the pixel without the color filter in the case of a bright subject.

The image generated by the image processing circuit 24 is sent to the liquid crystal display device driving circuit 25 and is displayed on the liquid crystal display device 9 (step S208).

Simultaneously, under the control of the CPU 20, the picked-up image signal is stored in the memory circuit 22 in the digital still camera 1 (step S209).

The photographing operation ends and the photographing person switches off the main switch (step S210). Then, the power source of the digital still camera 1 is turned off.

Second Embodiment

Figure 5A:
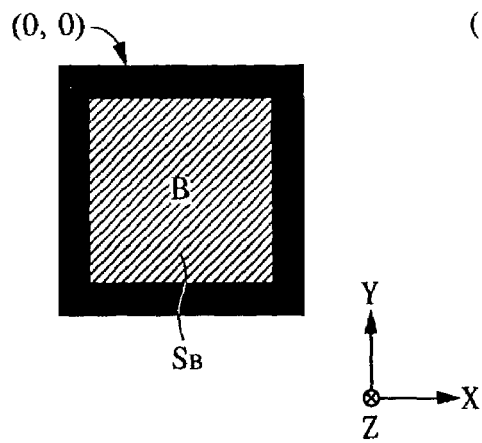
FIGS. 5A and 5B are explanatory diagrams of pixels of a digital still camera according to a second embodiment of the present invention.
Figure 5B:
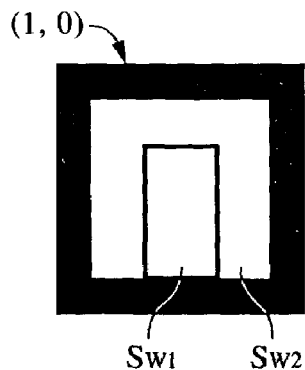

FIGS. 5A and 5B are explanatory diagrams of the pixels of the digital still camera 1 according to a second embodiment of the present invention. Referring to FIG. 5A, the pixel (0, 0) in FIG. 2 is shown. Referring to FIG. 5B, the pixel (1, 0) in FIG. 2 is shown.

Other structure according to the second embodiment is the same as that according to the first embodiment.

The pixel (0, 0) comprises the photoelectrically converting unit $S_B$. The pixel (1, 0) comprises a first photoelectrically converting unit $S_{W1}$ including the center portion and a second photoelectrically converting unit $S_{W2}$ which surrounds the first photoelectrically converting unit $S_{W1}$.

Since the pixel (1, 0) comprises the first photoelectrically converting unit $S_{W1}$ and the second photoelectrically converting unit $S_{W2}$, the luminance is adjusted based on the signals.

The areas of the photoelectrically converting unit $S_G$ and the photoelectrically converting unit $S_R$ of the pixels with the green and red color filters are the same as that of the photoelectrically converting unit $S_B$ of the pixel with the blue color filter.

A pixel without a color filter has higher light receiving efficiency than that of a pixel with a color filter, and the same control operation for a storing time of charges causes saturation thereof. Therefore, the sum of the areas of the first photoelectrically converting unit $S_{W1}$ and the second photoelectrically converting unit $S_{W2}$ of the pixels without the color filter are set to be smaller than the area of the photoelectrically converting unit $S_B$ of the pixel with the color filter The light transmittance of a pixel with a color filter is approximately ⅓ of that of a pixel without a color filter. If the area of the first photoelectrically converting unit $S_{W1}$ of the pixel without a color filter is smaller than ⅓ of that of a photoelectrically converting unit $S_B$ of the pixel with the color filter, the output of a pixel without a color filter is smaller than the output of a pixel with a color filter and a image having a high S/N ratio for the subject with a low luminance cannot be obtained.

Then, the area of the first photoelectrically converting unit $S_{W1}$ of a pixel without a color filter is set to ⅓ or more of the area of the photoelectrically converting unit $S_B$ of a pixel with a color filter, thus obtaining a preferable image.

In summary, according to the second embodiment, the areas of the first photoelectrically converting unit $S_{W1}$, the second photoelectrically converting unit $S_{W2}$, the photoelectrically converting unit $S_R$, the photoelectrically converting unit $S_G$, and the photoelectrically converting unit $S_B$ are as follows.

$$3 \times S_{W1} \geq S_B = S_G = S_R$$

$$(S_{W1}+S_{W2}) < S_B = S_G = S_R$$

Figure 6:
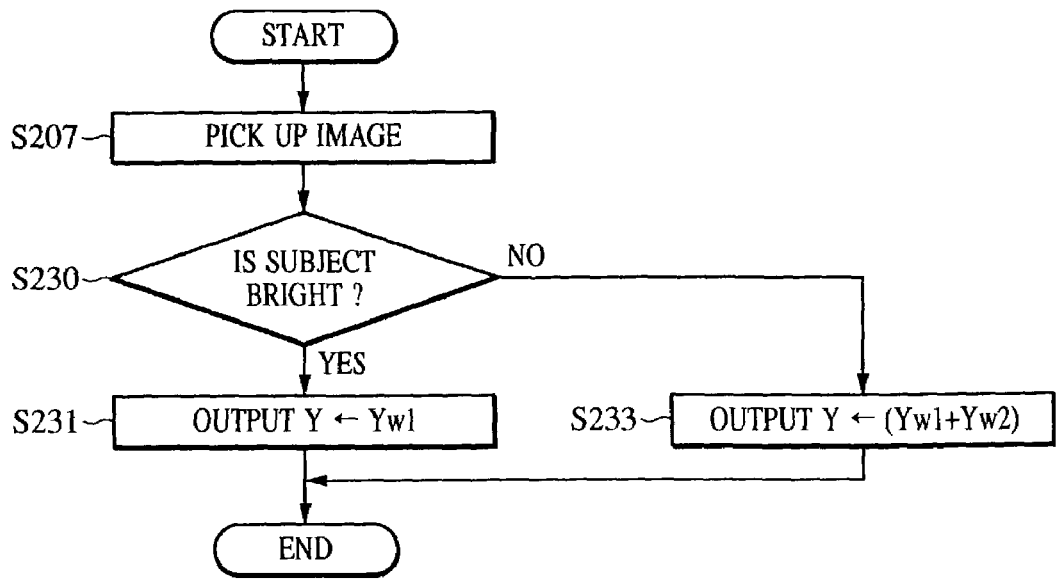
FIG. 6 is a flowchart showing the sequence of the adjustment of the luminance by the digital still camera having color filters shown in FIG. 5B.

FIG. 6 is a flowchart showing the sequence of the adjustment of the luminance by the digital still camera 1 having the color filters shown in FIG. 5B. Referring to FIG. 6, the sequence in step S207 of the adjustment of the luminance mentioned with reference to FIGS. 5A and 5B is shown.

The image pick-up operation in FIG. 4 is instructed (S207). Then, the CPU 20 determines whether or not the luminance of the subject is brighter than a predetermined threshold based on the previously picked-up image (step S230).

When it is determined in step S230 that the luminance of the subject is brighter than the predetermined threshold, it is controlled so that in the pixel without a color filter, only optical charges generated in the first photoelectrically converting unit $S_{W1}$ are output. As a result, saturation of the photoelectrically converting outputs is further prevented in the case of a bright subject and the image processing circuit 24 sets a photoelectrically converting output $Y_{W1}$ as a luminance signal Y (step S231).

When it is determined in step S230 that the luminance of the subject is darker than the predetermined threshold, it is controlled so that optical charges generated in the first photoelectrically converting unit $S_{W1}$ and optical charges generated in the second photoelectrically converting unit $S_{W2}$ are added and output. As a result, The image processing circuit 24 sets the photoelectrically converting output ($Y_{W1}$+ $Y_{W2}$) as a luminance signal Y (step S233).

Then, the CPU 20 sends the signal to the image sensor control circuit 21 and executes the image pick-up operation.

The color difference signal is generated by the output of the pixel to which the "R", "G", and "B" color filters are formed. The luminance signal is generated by the output of the pixel to which the color filter is not formed.

A sensitivity I of the white color of the photoelectrically converting unit of each pixel satisfies the following relationship, based on the transmittance of the color filter and the area of the photoelectrically converting unit.

$$(I_{W1}+I_{W2}) > I_{W1} \geq I_B \approx I_G \approx I_R$$

Herein, reference numeral $I_B$ denotes the sensitivity of the photoelectrically converting unit $S_B$, reference numeral $I_G$ denotes the sensitivity of the photoelectrically converting unit $S_G$, reference numeral $I_R$ denotes the sensitivity of the photoelectrically converting unit $S_R$, reference numeral $I_{W1}$ denotes the sensitivity of the first photoelectrically converting unit $S_{W1}$, and reference numeral $I_{W2}$ denotes the sensitivity of the second photoelectrically converting unit $S_{W2}$ which surrounds the first photoelectrically converting unit $S_{W1}$.

As mentioned above, when the luminance of the subject is high, the luminance signal is determined based on only the output $Y_{W1}$ of the first photoelectrically converting unit $S_{W1}$. When the luminance of the subject is low, the luminance signal is determined based on the output $Y_{W1}$ of the first photoelectrically converting unit $S_{W1}$ and the output $Y_{W2}$ of the second photoelectrically converting unit $S_{W2}$. Thus, a preferable image can be reproduced irrespective of the luminance of the subject.

According to the first embodiment, when the luminance of the subject is bright, the luminance signal is determined based on the output $Y_{W1}$ of the first photoelectrically converting unit $S_{W1}$. However, the luminance signal Y obtained from the output of a pixel with a color filter may be added and the added luminance signal may be determined.

Third Embodiment

Figure 7:
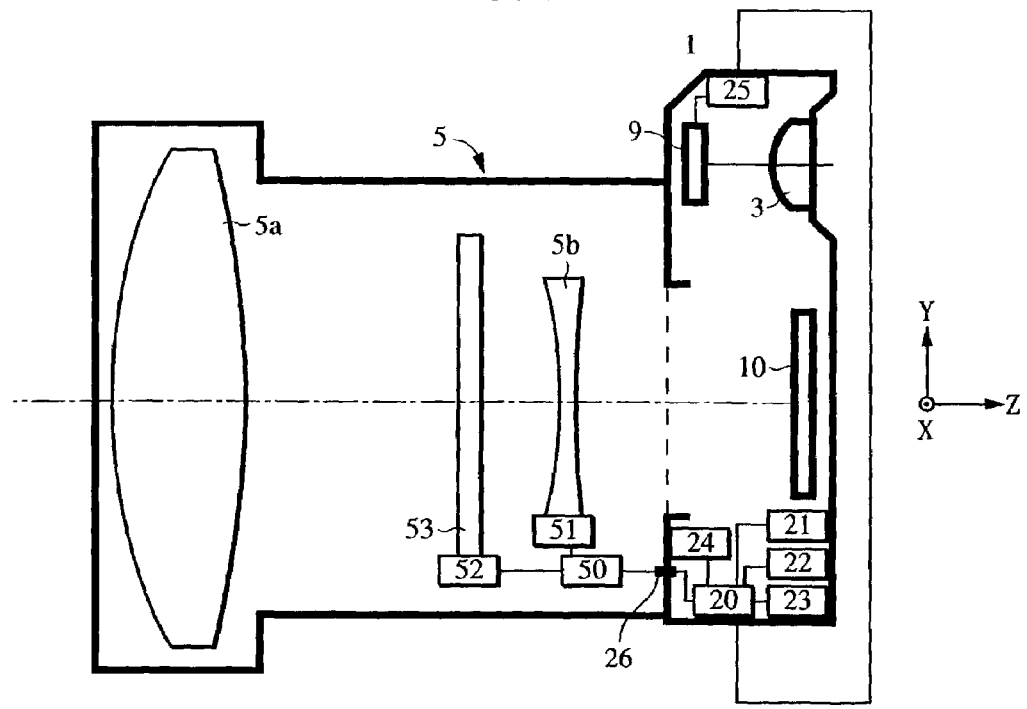
FIG. 7 is a block diagram showing the schematic structure of a digital still camera according to a third embodiment of the present invention.

FIG. 7 is a block diagram showing the schematic structure of a digital still camera 1 according to a third embodiment of the present invention. Referring to FIG. 7, reference numeral 52 denotes a driver for determining a value of the stop 53 to a predetermined stop value, reference numeral 50 denotes a lens CPU for controlling the operation of the lens driver 51 and the stop driving means 52, and reference numeral 26 denotes an electrical contact portion for intermediating information on the adjustment of the focal point, which is sent from the CPU 20 to the lens CPU 50.

Referring to FIG. 7, the same components as those in FIG. 1 are designated by the same reference numerals. However, the memory circuit 22 stores peculiar information (an F value of the opening aperture, information on an exit window, etc.) of the photographing lens 5. The photographing lens 5 is detachable to the main body of the digital still camera 1.

Figure 8:
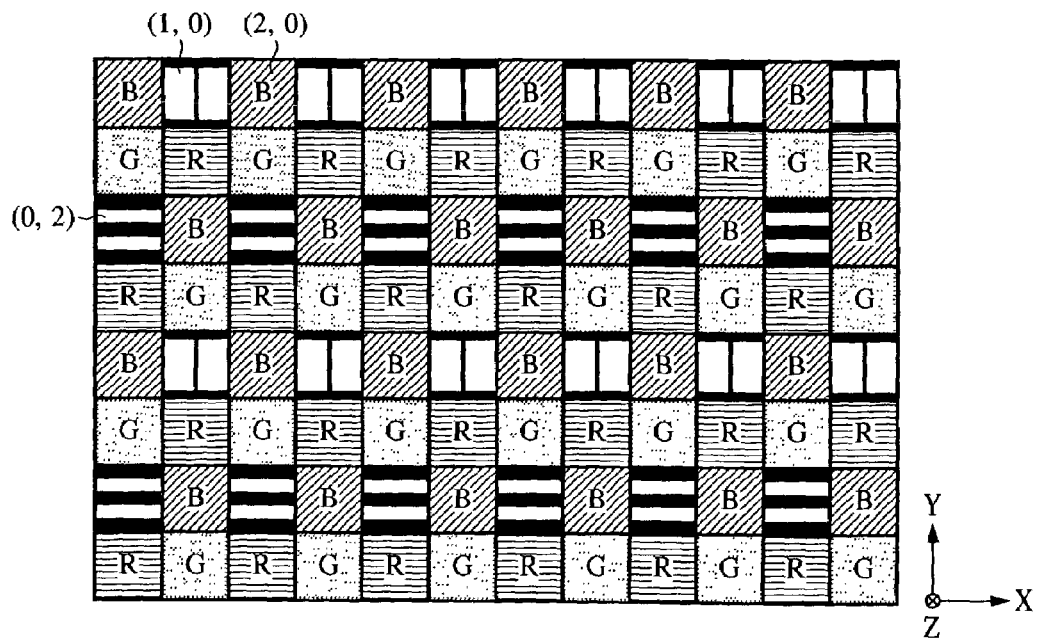
FIG. 8 is a plan view showing the schematic structure of an image sensor in FIG. 7.

FIG. 8 is a plan view showing the schematic structure of the image sensor 10 in FIG. 7, corresponding to FIG. 2. Although pixels having 12 rows and 8 columns are aligned in FIG. 8, the number of pixels corresponding to the use is actually aligned.

Reference symbols "R", "G", and "B" denote the color phases of red (R), green (G), and blue (B) color filters of the pixels. Pixels having the same color are aligned with gird patterns to improve the resolution of the picked-up image. Herein, the arrangement is similar to the Bayer arrangement.

FIGS. 9A to 9C are enlargement views of pixels (2,0), (0,2), and (1,0) in FIG. 8, corresponding to FIGS. 3A and 3B.

Referring to FIG. 9A, the pixel (2, 0) has the same structure of that of the pixel (0, 0) shown in FIG. 3A. The areas of the photoelectrically converting units $S_G$ and $S_R$ of the pixels with the green and red color filters are the same as that of the photoelectrically converting unit $S_B$ shown in FIG. 9A.

Referring to FIG. 9B, in the pixel (0, 2), two rectangular photoelectrically converting unit $S_{Wv}$ long in the X direction are aligned in the Y direction. A focusing state of the photographing lens 5 is detected based on the outputs of the photoelectrically converting units $S_{Wv}$. In particular, the detection of the focal point is preferably performed when the subject includes a parallel line in the Y direction.

Referring to FIG. 9C, in the pixel (1, 0), two rectangular photoelectrically converting unit $S_{Wh}$ long in the Y direction are aligned in the X direction. The focusing state of the photographing lens 5 is detected based on the outputs of the photoelectrically converting units $S_{Wh}$. In particular, the detection of the focusing point is preferably performed when the subject includes a parallel line in the X direction.

A gap between the photoelectrically converting units $S_{Wh}$ is narrower than that between the photoelectrically converting units $S_{Wv}$. The area of the photoelectrically converting units $S_{Wh}$ is wider than that between the photoelectrically converting units $S_{Wv}$.

Specifically, the area of each photoelectrically converting unit satisfies the following relation.

$$S_B = S_G = S_R > 2 \times S_{Wh} > 2 \times S_{Wv}$$

The area of a photoelectrically converting unit of a pixel without a color filter is set to be smaller than the area of a photoelectrically converting unit of a pixel with a color filter, thus preventing saturation of the photoelectrically converting unit of the pixel without the color filter upon normal photographing.

FIG. 10 is a cross sectional view of the image sensor 10 in FIG. 7. FIG. 10 shows a CMOS image sensor. Incidentally, the cross sectional view in FIG. 10 corresponds to the cross sectional view of the pixels in FIGS. 9A to 9C.

Referring to FIG. 10, reference numeral 117 denotes a P-type well, reference numeral 118 denotes an $SiO_2$ film as an MOS gate insulating film. Reference numerals $126\alpha_0$ to $126\gamma_0$ denote surface $P^+$ layers, and form n-layers $125\alpha_0$ to $125\gamma_0$ and photoelectrically converting units $101\alpha_0$ to $101\gamma_0$, respectively.

Reference numerals $120\alpha_0$ to $120\gamma_0$ are transfer gates for transferring optical charges stored in the photoelectrically converting units $101\alpha_0$ to $101\gamma_0$ to floating diffusion units (hereinafter, referred to as FD units) $121\alpha_0$ to $121\gamma_0$.

Further, reference numeral 129 denotes a color filter, and reference numeral 130 denotes a micro lens. The micro lens 130 is formed at a position and with a shape, in which the pupil of the photographing lens 5 and the photoelectrically converting units $101\alpha_0$ to $101\gamma_0$ of the image sensor 10 are conjugate.

In the pixel (1, 0), the photoelectrically converting units $101\alpha_0$ and $101\beta_0$ are formed by sandwiching the FD unit $121\beta_0$. Further, the optical charges generated in the photoelectrically converting units $101\alpha_0$ and $101\beta_0$ are transferred via the transfer gate $120\alpha_0$ and a transfer gate $120\beta_0'$.

In the pixel (2, 0), the FD unit $121\gamma_0$ is formed between the photoelectrically converting units $101\gamma_0$ and $101\beta_0$. Further, the optical charges generated in the photoelectrically converting units $101\gamma_0$ and $101\beta_0$ are transferred via the transfer gates $120\gamma_0$ and $120\beta_0$.

Herein, the transfer gates $120\gamma_0$ and $120\beta_0'$ are controlled by the same control pulse $\Phi TX\gamma_0$. The optical charges of the photoelectrically converting unit $101\beta_0$ are selectively transferred to the FD units $121\alpha_0$ and $121\gamma_0$ by high/low of control pulses $\Phi TX\beta_0$ and $\Phi TX\gamma_0$.

Figure 11:
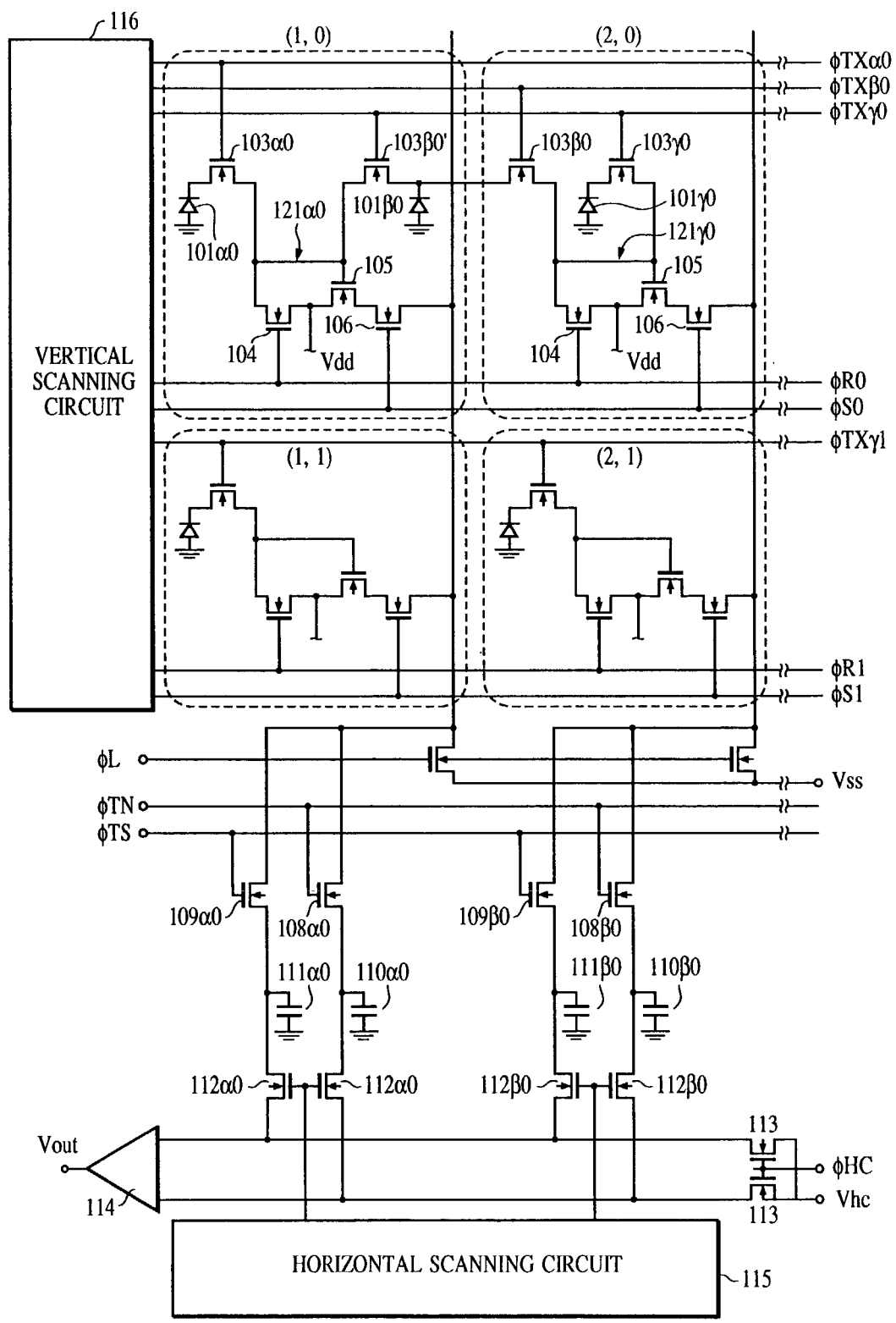
FIG. 11 is a circuitry diagram including the image sensor in FIG. 7.

FIG. 11 is a circuitry diagram including the image sensor 10 in FIG. 7. FIG. 11 shows four pixels (1, 0), (2, 0), (1, 1), and (2, 1) in FIG. 8.

Referring to FIG. 11, reference numerals $103\alpha_0$ to $103\gamma_0$ denote transfer switch MOS transistors including the transfer gates $120\alpha_0$ to $120\gamma_0$ in FIG. 10. Reference numeral 104 denotes an MOS transistor for reset which resets the FD units $121\alpha_0$ to $121\gamma_0$ and the like to a predetermined potential. Reference numeral 105 denotes a source follower amplifier MOS transistor for obtaining an amplification signal based on the charges transferred by the transfer switch MOS transistors $103\alpha_0$ to $103\gamma_0$. Reference numeral 106 denotes a horizontally selecting switch MOS transistor which selects a read pixel of the amplification signal obtained by the source follower amplifier MOS transistor 105. Reference numeral 107 denotes a working MOS transistor which forms a source follower together with the source follower amplifier MOS transistor 105. Reference numerals $108\alpha_0$ and $108\beta_0$ denote dark output transfer MOS transistors which transfer a dark output of the pixel. Reference numerals $109\alpha_0$ and $109\beta_0$ denote bright output transfer MOS transistors which transfer a bright output of the pixel. Reference numerals $110\alpha_0$ and $110\beta_0$ denote storage capacitors of the dark output for storing the dark output transferred by the dark output transfer MOS transistors $108\alpha_0$ and $108\beta_0$. Reference numeral $111\alpha_0$ and $111\beta_0$ denote storage capacitors of the bright output for storing the bright output transferred by the bright output transfer MOS transistors $109\alpha_0$ and $109\beta_0$. Reference numerals $112\alpha_0$ and $112\beta_0$ denote horizontally transfer MOS transistors which transfer the outputs stored in the storage capacitors $110\alpha_0$ and $110\beta_0$ of the dark output and the storage capacitors $111\alpha_0$ and $111\beta_0$ of the bright output. Reference numeral 113 denotes a horizontal output line reset MOS transistor which resets a horizontal output line to a predetermined potential. Reference numeral 114 denotes a difference output amplifier which amplifies and outputs the difference between the signals transferred along the horizontal output line. Reference numeral 115 denotes a horizontal scanning circuit which controls the on/off operation of the horizontally transfer MOS transistors $112\alpha_0$ and $112\beta_0$. Reference numeral 116 denotes a vertical scanning circuit which controls the on/off operation of the transfer switch MOS transistors $103\alpha_0$ to $103\gamma_0$.

Figure 12A:
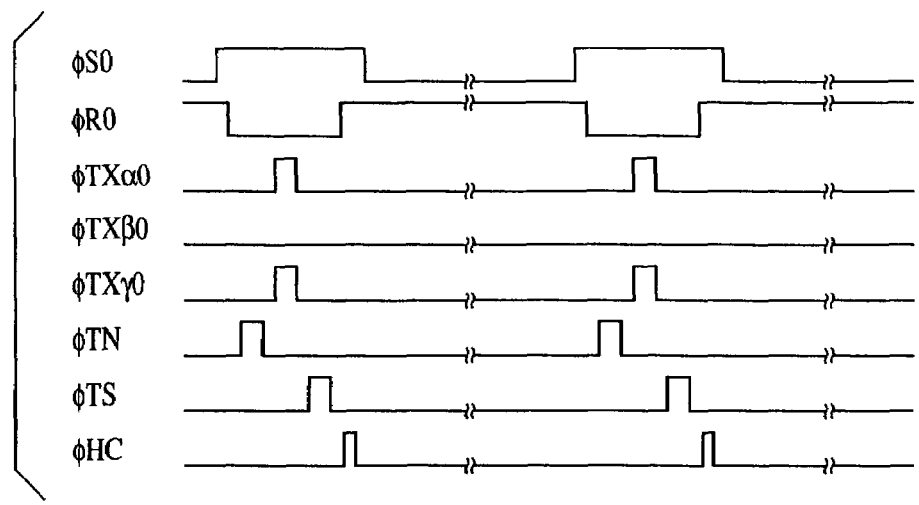
FIGS. 12A and 12B are timing charts showing the operation of circuits in the image sensor in FIG. 11.
Figure 12B:
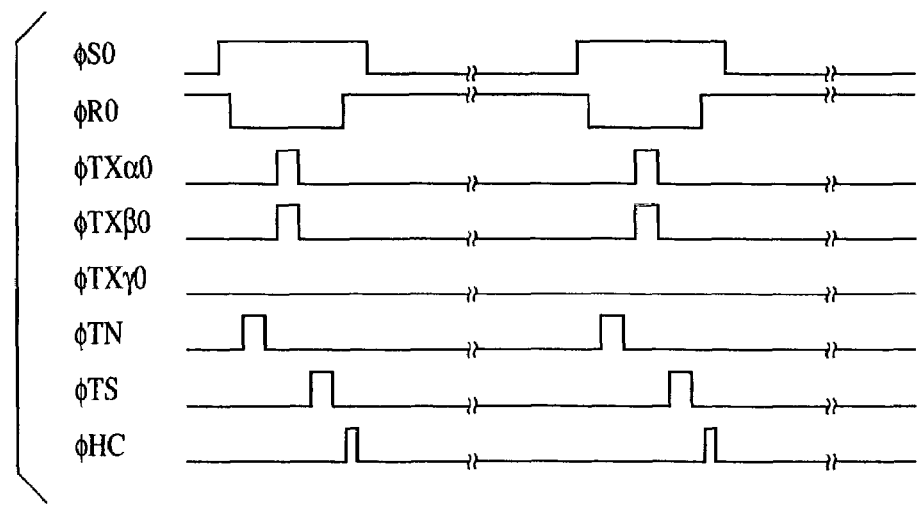

FIGS. 12A and 12B are timing charts showing the operation of circuits in the image sensor 10 in FIG. 11. FIG. 12A shows a timing chart of a 0-th line in the case of normal image pick-up operation. FIG. 12B shows a timing chart of the 0-th line in the case of reading the image for detecting the focal point.

In summary, the image pick-up operation will be described. In the pixel (1, 0), the charges converted by the photoelectrically converting units $101\alpha_0$ and $101\beta_0$ are transferred to the FD unit $121\alpha_0$. The charges are added by the FD unit $121\alpha_0$ and are read. In this case, in the pixel (2, 0), the charges converted by the photoelectrically converting unit $101\gamma_0$ are transferred to the FD unit $121\gamma_0$ and are read.

The image pick-up operation will specifically be described with reference to FIG. 12A. First, a control pulse $\Phi S_0$ is switched to the high level by a timing output from the vertical scanning circuit 116. The horizontally selecting switch MOS transistor 106 is turned on and the pixel portion in the 0-th line is selected.

Next, a control pulse $\Phi R_0$ is switched to the low level. The reset operation of the FD units $121\alpha_0$ and $121\gamma_0$ is stopped, thereby setting the FD units $121\alpha_0$ and $121\gamma_0$ to be in a floating state. A gate of the source follower amplifier MOS transistor 105 is through a source thereof. Then, after a predetermined time, a control pulse $\Phi TN$ is temporarily switched to the high level. Thus, dark voltages of the FD units $121\alpha_0$ and $121\gamma_0$ are outputted to the storage capacitors $110\alpha_0$ and $110\beta_0$ of the dark output by the source follower operation.

Next, control pulses $\Phi TX\alpha_0$ and $\Phi TX\gamma_0$ are temporarily switched to the high level so as to output the charges from the photoelectrically converting units $101\alpha_0$ to $101\gamma_0$ of the pixels of the 0-th line, and the transfer switch MOS transistors $103\gamma_0$, $103\beta_0'$ and $103\gamma_0$ are made conductive.

The charges converted by the photoelectrically converting units $101\alpha_0$ and $101\beta_0$ are transferred to the FD unit $121\alpha_0$. The charges converted by the photoelectrically converting unit $101\gamma_0$ are transferred to the FD unit $121\gamma_0$.

The charges from the photoelectrically converting units $101\alpha_0$ and $101\beta_0$ are transferred to the FD unit $121\alpha_0$. Thus, the potential of the FD unit $121\alpha_0$ is changed in accordance with the light. In this case, the source follower amplifier MOS transistor 105 is set to be in the floating state. Therefore, the potentials of the FD units $121\alpha_0$ and $121\gamma_0$ are output to the storage capacitors $111\alpha_0$ and $111\beta_0$ of the bright output by temporarily setting a control pulse $\Phi TS$ to the high level.

At this point, the dark output and bright output of the pixels (1, 0) and (2, 0) are stored in the storage capacitors $110\alpha_0$ and $110\beta_0$ of the dark output and the storage capacitors $111\alpha_0$ and $111\beta_0$ of the bright output. Further, the control pulse $\Phi HC$ is temporarily switched to the high level and the horizontal output line reset MOS transistor 113 is made conductive, thereby resetting the horizontal output line.

The dark output and bright output of the pixels (1, 0) and (2, 0) are output to the horizontal output line by sending scanning timing signals to the horizontal transfer MOS transistors $112\alpha_0$ and $112\beta_0$ from the horizontal scanning circuit 115 for the horizontal transfer period.

In this case, signals from the storage capacitors $110\alpha_0$ and $110\beta_0$ of the dark output and the storage capacitors $111\alpha_0$ and $111\beta_0$ of the bright output are amplified by the difference of the difference amplifier 114 and generate an output Vout. Therefore, it is possible to obtain a signal having a preferable S/N ratio excluding random noise of the pixel and a fixed pattern noise.

Thereafter, the control pulse $\Phi R_0$ is switched to the high level, and the control pulse $\Phi S_0$ is switched to the low level, thereby ending the selection of the pixels of the 0-th line.

Further, similarly, the vertical scanning circuit 116 sequentially reads the charges from the pixels of the next line, thereby outputting the signals from all the pixels of the image sensor 10. The output is subjected to signal processing by the image processing circuit 24 and is displayed on the liquid crystal display device 9. Then, the image is stored in the memory circuit 22.

The outline of the detection of the focal point will be described. Two images obtained from the outputs of the photoelectrically converting units $101\alpha_0$ and $101\beta_0$ are subjected to correlative calculation. The focusing state of the photographing lens 5 is detected from the amount of offset between the two images.

The output of the photoelectrically converting unit $101\gamma_0$ is not read. The output of the photoelectrically converting unit $101\gamma_0$ is output from the pixel (2, 0).

The operation for detecting the focusing state will specifically be described with reference to FIG. 12B. First, the control pulse $\Phi S_0$ is switched to the high level by a timing output from the vertical scanning circuit 116. The horizontally selecting switch MOS transistor 106 is turned on and the pixel portion in the 0-th line is selected.

Next, the control pulse $\Phi R_0$ is switched to the low level. The reset operation of the FD units $121\alpha_0$ and $121\gamma_0$ is stopped, thereby setting the FD units $121\alpha_0$ and $121\gamma_0$ to be in the floating state. The gate of the source follower amplifier MOS transistor 105 is through the source thereof. Then, after a predetermined time, the control pulse $\Phi TN$ is temporarily switched to the high level. Thus, dark voltages of the FD units $121\alpha_0$ and $121\gamma_0$ are output to the storage capacitors $110\alpha_0$ and $110\beta_0$ of the dark output by the source follower operation.

Next, the control pulses $\Phi TX\alpha_0$ and $\Phi TX\beta_0$ are temporarily switched to the high level, thereby making the transfer switch MOS transistors $103\alpha_0$ and $103\beta_0$ conductive. The charges converted by the photoelectrically converting units $101\alpha_0$ and $101\beta_0$ are transferred to the FD units $121\alpha_0$ and $121\alpha_0$.

In this case, the control pulse $\Phi TX\gamma_0$ is low and therefore the optical charges of the photoelectrically converting unit $101\gamma_0$ are not transferred to the FD unit $121\gamma_0$.

The charges from the photoelectrically converting units $101\alpha_0$ and $101\beta_0$ are transferred to the FD units $121\alpha_0$ and $121\gamma_0$. Thus, the potentials of the FD unit $121\alpha_0$ and $121\gamma_0$ are changed in accordance with the light. In this case, the source follower amplifier MOS transistor 105 is set to be in the floating state. Therefore, the potentials of the FD units $121\alpha_0$ and $121\gamma_0$ are output to the storage capacitors $111\alpha_0$ and $110\beta_0$ of the bright output by temporarily setting the control pulse $\Phi TS$ to the high level.

In this case, the dark output and bright output of the pixels (1, 0) and (2, 0) are stored in the storage capacitors $110\alpha_0$ and $110\beta_0$ of the dark output and in the storage capacitors $111\alpha_0$ and $111\beta_0$ of the bright output. Further, the control pulse $\Phi HC$ is temporarily switched to the high level. Thus, the horizontal output line reset MOS transistor 113 is made conductive and the horizontal output line is reset.

The dark output and light output of the pixels (1, 0) and (2, 0) are output to the horizontal output line by sending scanning timing signals to the horizontal transfer MOS transistors $112\alpha_0$ and $112\beta_0$ from the horizontal scanning circuit 115 for the horizontal transfer period.

In this case, signals from the storage capacitors $110\alpha_0$ and $110\beta_0$ of the dark output and the storage capacitors $111\alpha_0$ and $111\beta_0$ of the bright output are amplified by the difference of the difference amplifier 114 and generate an output Vout. Therefore, a signal having a preferable S/N ratio excluding the random noise of the pixel and the fixed pattern noise.

Thereafter, the control pulse $\Phi R_0$ is switched to the high level, and the control pulse $\Phi S_0$ is switched to the low level, thereby ending the selection of the pixels of the 0-th line.

The output from the image sensor 10 is shaped as an image signal for detecting the focal point by the calculation of the CPU 20. After the correlation calculation, the focal point of the photographing lens 5 is calculated.

Figure 13:
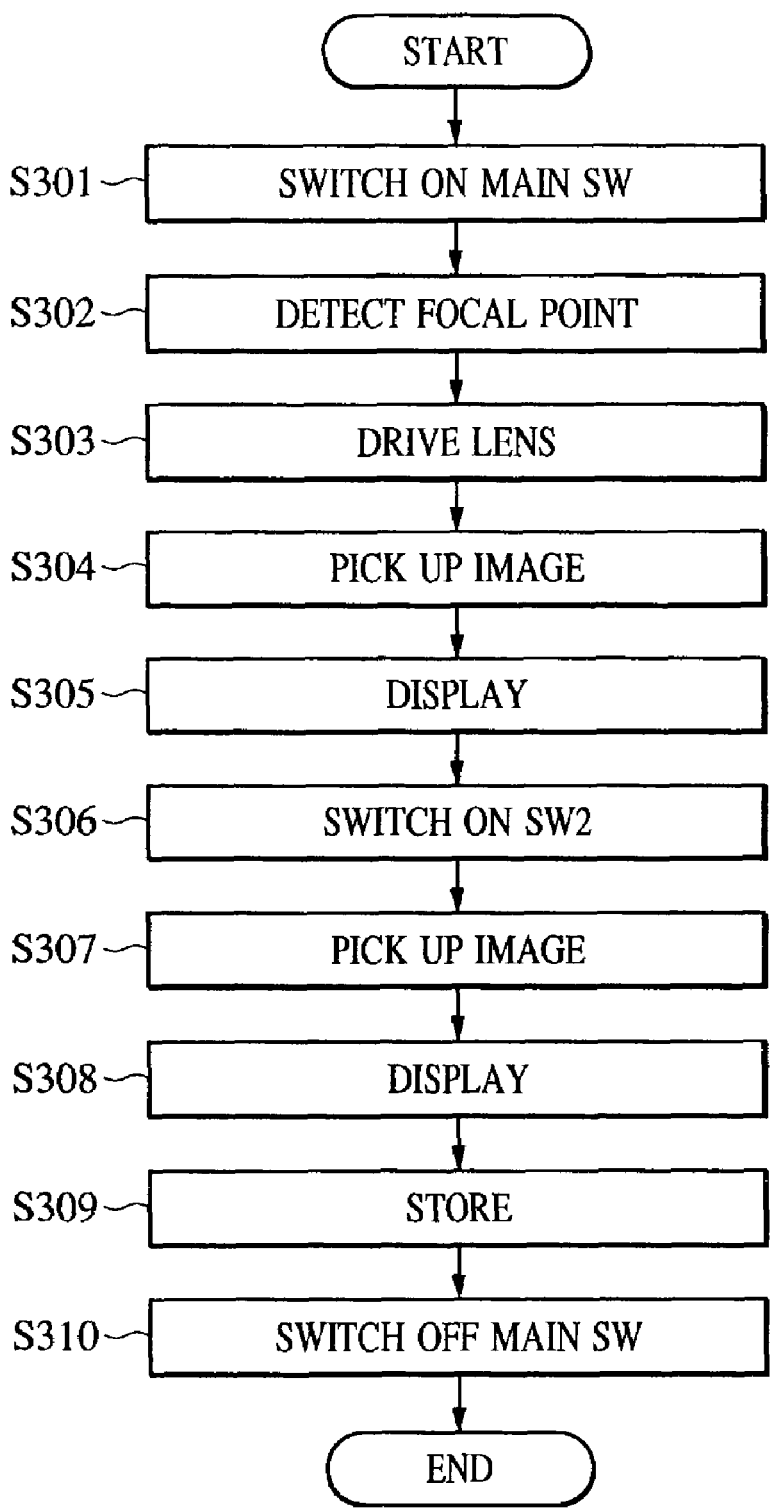
FIG. 13 is a flowchart showing the operation of the digital still camera in FIG. 7.

FIG. 13 is a flowchart showing the operation of the digital still camera 1 in FIG. 7.

The photographing person switches on the main switch of the digital still camera 1 (not shown in FIG. 7) (step S301). The CPU 20 performs the calculation for detecting the focal point of the photographing lens 5.

The focal point of the photographing lens 5 is detected by using the output of the image sensor 10. A method for detecting the focusing state of the photographing lens 5 using the image generated by the beams for transmitting the different areas of the pupil of the photographing lens 5 uses the method disclosed in Japanese Unexamined Patent Application Publication No. 2001-124984 (step S302).

The amount of defocusing of the photographing lens 5 is calculated based on the output of the image sensor 10. Then, the amount of driving of the photographing lens 5 is calculated. The CPU 20 sends a lens driving signal to the photographing lens driving means 51 via the lens CPU 50 based on the calculation result. The photographing lens driving means 51 drives the photographing lens 5 in accordance with the lens driving signal so as to set the photographing lens 5 in the in-focus state (step S303).

When the adjustment of the focal point of the photographing lens 5 is completed, the CPU 20 allows the image sensor 10 to pick up the image via the image sensor control circuit 21 (step S304).

The image signal picked up by the image sensor 10 is subjected to image processing after it is A/D converted by the image processing circuit 24. In this case, predetermined image processing is performed based on the output signal from the image sensor 10 for purpose of the color reproduction.

The image signal which is subjected to image processing is displayed on the liquid crystal display device 9 by the liquid crystal display device driving circuit 25 so as to permit the photographs to observe the subject image via the eye piece 3 (step S305).

Further, the CPU 20 switches on the switch SW2 for recording the picked-up image (step S306). Then, the CPU 20 sends the control signal to the image sensor control circuit 21, and the image sensor 10 performs the actual image pick-up operation (step S307).

The image processing circuit 24 sends to the liquid crystal display device driving circuit 25, the image generated by the image processing including the adjustment of luminance, which will be described later, and it displays the sent image on the liquid crystal display device 9 (step S308).

Simultaneously, the CPU 20 stores the picked-up image signal in the memory circuit 22 in the digital still camera 1 (step S309).

The photographing operation ends and the photographing person switches off the main switch (step S310). Then, the power source of the digital still camera 1 is turned off.

Upon adjustment of the luminance, only the charges from the pixels of one line may be read. Preferably, the line for reading the charges is approximately in the center of the image sensor 10 in consideration of condensing characteristics of the photographing lens 5.

Figure 14:
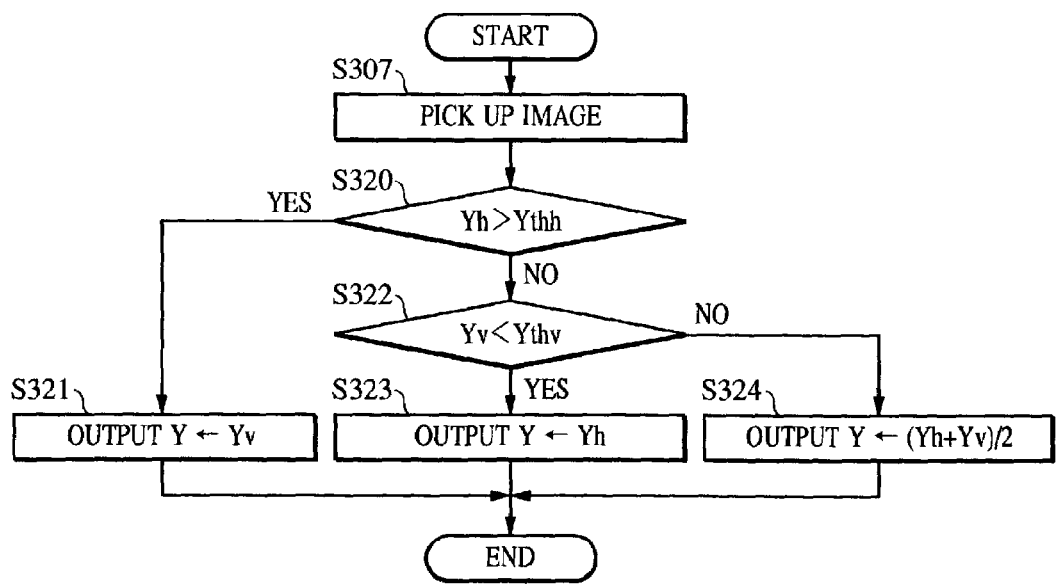
FIG. 14 is a flowchart showing the sequence for calculating a luminance signal to adjust the luminance by an image processing circuit in FIG. 7.

FIG. 14 is a flowchart showing the sequence for calculating the luminance signal for adjusting the luminance by the image processing circuit 24 in FIG. 7, corresponding to FIG. 6. Further, FIG. 14 shows the above-mentioned sequence for determining the luminance signal Y of the image in step S307.

According to the third embodiment, the color difference signal is generated from the outputs of the pixels with the "R", "G", and "B" color filters, and the luminance signal Y is generated by the output of the pixels without color filters.

The sensitivity I for the white light of each pixel satisfies the following relation based on the areas of the photographing converting units and the transmittances of the color filters.

$$2 \times I_{Wh} > I_B \approx I_G \approx I_R \geqq 2 \times I_{Wv}$$

Herein, reference numeral $I_B$ denotes the sensitivity of the photoelectrically converting unit $S_B$. Reference numeral $I_G$ denotes the sensitivity of the photoelectrically converting unit $S_G$. Reference numeral $I_R$ denotes the sensitivity of the photoelectrically converting unit $S_R$. Reference numeral $I_{Wh}$ denotes the sensitivity of the photoelectrically converting unit $S_{Wh}$. Reference numeral $I_{Wv}$ denotes the sensitivity of the photoelectrically converting unit $S_{Wv}$.

The luminance signal as a basic unit of the image consisting of the pixels (0, 0), (1, 0), (0, 1), and (1, 1) shown in FIG. 8 is determined based on an output Yh of the pixel (1, 0) and an output Yv of the pixel (0, 2).

First, the image processing circuit 24 determines whether or not the output Yh of the pixel (1, 0) is larger than a predetermined threshold Ythh (step S320).

If the luminance of the subject is bright and the output Yh of the pixel is larger than the threshold Ythh, the luminance signal Y is set to the output Yv of the pixel (0, 2) (step S321).

On the other hand, if the output Yh of the pixel is smaller than the threshold Ythh, it is determined whether or not the output Yv of the pixel (0, 2) is smaller than the threshold Ythv (step S322).

If the luminance of the subject is dark and the output of the pixel Yv is smaller than the threshold Ythv, the luminance signal Y is set to the output Yh of the pixel (1, 0) (step S323).

On the other hand, if the output Yv of the pixel is larger than the threshold Ythv, the luminance signal Y is set to the average between the output Yh of the pixel (1, 0) and the output Yv of the pixel (0, 2) (step S324).

As mentioned above, when the luminance of the subject is higher, the luminance is determined based on the output Yv of the photoelectrically converting unit $S_{Wv}$ with a relatively small area. When the luminance of the subject is lower, the luminance is determined based on the output Yh of the photoelectrically converting unit $S_{Wh}$ with a relatively large area. Thus, the image can preferably be reproduced irrespective of the luminance of the subject.

According to the third embodiment, the case of adjusting the luminance based on the outputs of the pixels (1, 0) and (0, 2) is described. However, the luminance may be adjusted, based on a pixel having the same structure as that of the above-mentioned pixels and the outputs of a plurality of pixels.

Further, the luminance may be adjusted based on the output of the single photoelectrically converting unit. Also, the luminance may be adjusted in consideration of the output of the pixel with the color filter of the pixel (0, 1), etc.

According to the first to third embodiments, the case of physically converting the area of the photoelectrically converting unit is described. However, the size of the photoelectrically converting area on which the optical signal is incident may be changed by setting the areas of the photoelectrically converting units to be the same and by forming shielding films having different opening regions.

Furthermore, according to the first to third embodiments, a part of the pixels without the color filter is described. However, an almost transparent color filter with exceedingly high transmittance may be arranged in a part of the pixels.

As mentioned above, according to the first to third embodiments, a pixel for an image pick-up operation and a pixel for detecting the focal point are provided and therefore both the image pick-up operation and the detection of the focal point can preferably be performed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pick-up apparatus, comprising:
   a plurality of pixels, each of said pixels including at least one photoelectrically converting area for converting an optical signal from a subject into an electronic signal, wherein a plurality of first pixels included in said plurality of pixels have a first transmittance as a light transmittance to said photoelectrically converting area, a plurality of second pixels included in said plurality of pixels have a second transmittance as a light transmittance to said photoelectrically converting area, the second transmittance being higher than the first transmittance, and a light receiving area for receiving light of a pixel of said plurality of first pixels is larger than a light receiving area for receiving light of a pixel of said plurality of second pixels;
   wherein each of said first pixels has a plurality of photoelectrically converting areas, a common amplifying device which amplifies and outputs signals from said plurality of photoelectrically converting areas, and a plurality of first transfer switches which connect said common amplifying device to said plurality of photoelectrically converting areas, each of said second pixels has an amplifying device which amplifies and outputs signals from said photoelectrically converting area and a second transfer switch which connects said photoelectrically converting area to said amplifying device;
   wherein a third transfer switch transfers the signal from at least one of said photoelectrically converting areas included in one of said first pixels to said amplifying device included in one of said second pixels; and
   wherein a driving circuit has a first mode in which an input unit in said common amplifying device mixes the signals from said plurality of photoelectrically converting areas included in the one of said first pixels and a mixed signal is read from said common amplifying device, and a second mode in which the signal from one photoelectrically converting area among said plurality of photoelectrically converting areas included in the one of said first pixels is read from said common amplifying device included in the one of said first pixels and the signal from another photoelectrically converting area among said plurality of photoelectrically converting areas included in the one of said first pixels is read from said amplifying device included in the one of said second pixels.

2. An apparatus according to claim 1, further comprising:
   a control circuit which forms an image based on the signal read in the first mode and detects a focal point based on the signal read in the second mode.

3. An image pick-up apparatus comprising:
   a plurality of pixels including a first pixel and a second pixel, said first pixel having a plurality of photoelectrically converting areas, a common amplifying device for amplifying and outputting signals from said plurality of photoelectrically converting areas, and a plurality of first transfer switches for connecting said common amplifying device to said plurality of photoelectrically converting areas, said second pixel having at least a photoelectrically converting area, an amplifying device for amplifying and outputting a signal from said photoelectrically converting area, and a second transfer switch for connecting said photoelectrically converting area to said amplifying device; and
   a third switch for transferring the signal from one of said photoelectrically converting areas included in said first pixel to said amplifying device included in said second pixel.

4. An apparatus according to claim 3, further comprising:
   a driving circuit having a first mode in which an input unit in said common amplifying device mixes the signals from said plurality of photoelectrically converting areas included in said first pixel and a mixed signal is read from said common amplifying device, and a second mode in which the signal from one photoelectrically converting area among said plurality of photoelectrically converting areas included in said first pixel is read from said common amplifying device included in said first pixel and the signal from another photoelectrically converting area among said plurality of photoelectrically converting areas included in said first pixel is read from said amplifying device included in said second pixel.

5. An apparatus according to claim 4, further comprising:

a control circuit which forms an image based on the signal read in the first mode and detects a focal point based on the signal read in the second mode.

* * * * *

UNITED STATES PATENT AND TRADEMARK OFFICE
CERTIFICATE OF CORRECTION

PATENT NO. : 7,095,441 B2
APPLICATION NO. : 10/278808
DATED : August 22, 2006
INVENTOR(S) : Nagano It is certified that error appears in the above-identified patent and that said Letters Patent is hereby corrected as shown below:

COLUMN 3:
Line 46, "unit SW" should read --unit $S_w$--.

COLUMN 5:
Line 45, "Other" should read --Another--.

COLUMN 7:
Line 50, "gird" should read --grid--.
Line 64, "unit" should read --units--.

COLUMN 8:
Line 4, "unit" should read --units--.

COLUMN 10:
Line 3, "sistors $103\gamma_0$," should read --sistors $103\alpha_0$,--.
Line 54, "unit $101\gamma_0$" should read --unit $101\beta_0$--.

COLUMN 11:
Line 9, "$121\alpha_0$." should read --$121\gamma_0$.--.
Line 38, "having" should read --has--.

Signed and Sealed this

Third Day of June, 2008

JON W. DUDAS
*Director of the United States Patent and Trademark Office*